(12) United States Patent
Chasin

(10) Patent No.: US 10,540,064 B1
(45) Date of Patent: Jan. 21, 2020

(54) FRAMEWORK FOR CREATING HIERARCHICAL NAVIGATION TREES USING USER INTERFACE PLUGINS

(71) Applicant: Juniper Networks, Inc., Sunnyvale, CA (US)

(72) Inventor: Andrew S. Chasin, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 367 days.

(21) Appl. No.: 15/387,596

(22) Filed: Dec. 21, 2016

(51) Int. Cl.
*G06F 3/0484* (2013.01)
*G06F 17/22* (2006.01)
*G06F 3/0482* (2013.01)
*G06F 16/901* (2019.01)

(52) U.S. Cl.
CPC .......... *G06F 3/0484* (2013.01); *G06F 3/0482* (2013.01); *G06F 16/9027* (2019.01); *G06F 17/2241* (2013.01)

(58) Field of Classification Search
None
See application file for complete search history.

(56) References Cited

U.S. PATENT DOCUMENTS

| | | | | | |
|---|---|---|---|---|---|
| 5,666,501 | A | * | 9/1997 | Jones | G06F 8/61 |
| | | | | | 709/222 |
| 6,415,298 | B1 | * | 7/2002 | Oesterer | G06F 8/71 |
| 7,451,154 | B2 | * | 11/2008 | Solomon | G06F 16/10 |
| 7,814,437 | B2 | * | 10/2010 | Marchev | G06F 9/451 |
| | | | | | 715/853 |
| 7,979,808 | B2 | * | 7/2011 | Stiso | G06F 3/0482 |
| | | | | | 370/408 |
| 2006/0218528 | A1 | * | 9/2006 | Lerner | G06F 8/60 |
| | | | | | 717/120 |
| 2007/0168882 | A1 | * | 7/2007 | Moehrle | G06F 3/0482 |
| | | | | | 715/810 |
| 2008/0295074 | A1 | * | 11/2008 | Schneider | G06F 8/36 |
| | | | | | 717/120 |

OTHER PUBLICATIONS

Comar et al., "Dynamic Plug-in Loading with Ada," AdaCore, ACM SIGda Ada Letters, vol. XXV Issue 2, Jun. 1. 2005, pp. 31-41.
"Network management software for the most demanding organizations worldwide," Entuity, retrieved on Oct. 11, 2016, from https://entuity.com/solutions/network-management-software/, 17 pp.

* cited by examiner

*Primary Examiner* — Christopher J Fibbi
(74) *Attorney, Agent, or Firm* — Shumaker & Sieffert, P.A.

(57) ABSTRACT

A computing device stores data defining a hierarchical navigation tree. For each respective user interface (UI) plugin of a plurality of UI plugins the device receives metadata for the respective UI plugin. The metadata for the respective UI plugin comprises a respective path descriptor for the respective UI plugin. For each respective node identified in the respective path descriptor for the respective UI plugin, the device marks the respective node identified by the respective path element as being active. The device outputs a UI for display. The UI comprises a pruned representation of the hierarchical navigation tree. For each respective node of a plurality of nodes in the hierarchical navigation tree, the pruned representation of the hierarchical navigation tree includes a label of the respective node in response to determining the respective node is marked as active. The UI may be a single-pane-of-glass interface that comprises nodes associated with separately developed UI plugins.

18 Claims, 7 Drawing Sheets

FRAMEWORK FOR CREATING HIERARCHICAL NAVIGATION TREES USING USER INTERFACE PLUGINS

TECHNICAL FIELD

The disclosure relates to creating hierarchical navigation tree user interfaces.

BACKGROUND

Hierarchical navigation trees are common design elements in graphical user interfaces (GUIs). A hierarchical navigation tree includes a set of hierarchically arranged nodes. For instance, a root node of a hierarchical navigation tree may have one or more child nodes, one or more of the child nodes may have one or more child nodes of their own, and so on. Each node may have a corresponding label that is displayed in a GUI. For instance, the root node may be labeled "Devices," child nodes of the root node may be labeled "Device type A," "Device type B," and "Device type C." In some examples, portions of a hierarchical navigation tree are collapsible such that all descendant nodes of a particular node of the hierarchical navigation tree are hidden in the GUI.

Receiving input from a user selecting a node of a hierarchical navigation tree may cause a computing device to output a specific UI associated with the node. For instance, in the example above, receiving a user input selecting the node labeled "Device type A" may cause the computing device to output a list of all devices of type A.

The structures of hierarchical navigation trees may be hardcoded in a fixed manner in the programming of applications presenting the hierarchical navigation trees. Moreover, the functionality of each node of a hierarchical navigation tree may be hardcoded in an application presenting the hierarchical navigation tree.

SUMMARY

In general, techniques are described that implement a framework for dynamically creating hierarchical navigation trees using user interface (UI) plugins. As described herein, UI framework software dynamically constructs a hierarchical navigation tree based on navigation path information provided by UI plugins. Constructing the hierarchical navigation tree in this way may improve the functioning of a computing device by allowing the computing device to efficiently build the hierarchical navigation tree while maintaining the ability to update the hierarchical navigation tree later.

Based on information provided by the UI plugins, the computing device selects only those nodes of the navigation tree that are classified as active, and displays the selected active nodes of the navigation tree on the user interface, without displaying inactive nodes on the user interface. In this way, the computing device may not be required to display as much data on the user interface. Thus, the pruned navigation tree may take up less viewable area on the user interface when output for display than a navigation tree would in the absence of the techniques of this disclosure. The techniques of this disclosure may reduce instances of the computing device receiving requests from a user attempting to navigate areas of the navigation tree that are not active, thereby reducing instances of the computing device handling unnecessary requests, and avoiding an inefficient or frustrating user experience.

The techniques of this disclosure may also enable the computing device to easily and dynamically build a single navigation tree that includes separately-developed UI plugins, i.e., UI plugins developed by different third-party developers. This may avoid the computing device having to store separate navigation trees for separately-developed UI plugins, thereby conserving computing resources such as memory.

In one example, this disclosure describes a method comprising: storing, by a computing device, data defining a hierarchical navigation tree that comprises a tree of nodes; for each respective user interface (UI) plugin of a plurality of UI plugins: receiving, by UI framework software executing on the computing device, metadata for the respective UI plugin, the metadata for the respective UI plugin comprising a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and for each respective node identified by a respective path element in the respective series of path elements for the respective UI plugin that has not previously been marked as active, marking, by the UI framework software, the respective node identified by the respective path element as being active; outputting, by the computing device, a UI for display, the UI comprising a pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active, and the pruned representation of the hierarchical navigation tree includes no visible indication of the respective node in response to determining the respective node is not marked as active; and for a particular UI plugin of the plurality of UI plugins, using, by the UI framework software, the reference to the code module for the particular UI plugin to initiate execution of the particular UI plugin.

In another example, this disclosure describes a computing device comprising: a memory configured to store data defining a hierarchical navigation tree that comprises a tree of nodes; and one or more processing circuits configured to: for each respective UI plugin of a plurality of UI plugins: receive metadata for the respective UI plugin, the metadata for the respective UI plugin comprises a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and for each respective node identified by a respective path element in the respective series of path elements for the respective UI plugin that has not previously been marked as active, mark the respective node identified by the respective path element as being active;

output a UI for display, the UI comprising a pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active and the pruned representation of the hierarchical navigation tree includes no visible indication of the respective node in response to determining the respective node is not marked as active; and for a particular UI plugin of the plurality of UI plugins, use the reference to the code module for the particular UI plugin to initiate execution of the particular UI plugin.

In another example, this disclosure describes a non-transitory computer-readable data storage medium having instructions thereon that, when executed, configure a computing device to: store data defining a hierarchical navigation tree that comprises a tree of nodes; for each respective UI plugin of a plurality of UI plugins: receive metadata for the respective UI plugin, the metadata for the respective UI plugin comprises a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and for each respective node identified by a respective path element in the respective series of path elements for the respective UI plugin that has not previously been marked as active, mark the respective node identified by the respective path element as being active; output a UI for display, the UI comprising a pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active and the pruned representation of the hierarchical navigation tree includes no visible indication of the respective node in response to determining the respective node is not marked as active; and for a particular UI plugin of the plurality of UI plugins, use the reference to the code module for the particular UI plugin to initiate execution of the particular UI plugin.

The details of one or more embodiments of this disclosure are set forth in the accompanying drawings and the description below. Other features, objects, and advantages will be apparent from the description, drawings, and claims.

BRIEF DESCRIPTION OF DRAWINGS

Like reference characters denote like elements throughout the description and figures.

DETAILED DESCRIPTION

Figure 1:
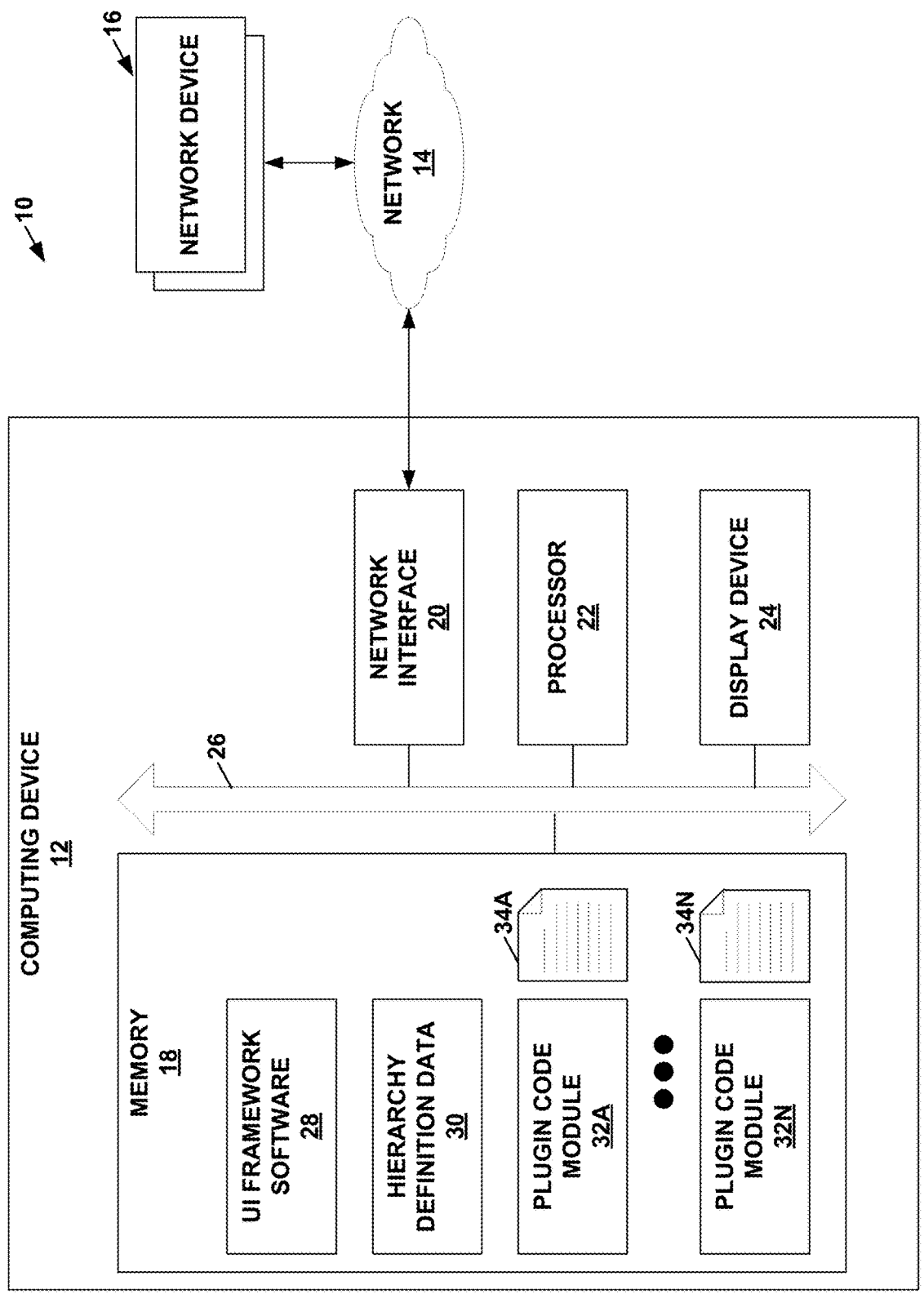
FIG. 1 is a block diagram illustrating an example system in which techniques of this disclosure may be implemented.

FIG. 1 is a block diagram illustrating an example system 10 in which techniques of this disclosure may be implemented. System 10 includes a computing device 12, a network 14, and a set of network devices 16. Computing device 12 may communicate with network devices 16 via network 14.

Computing device 12 may comprise various types of computing devices. For example, computing device 12 may comprise a personal computer, a server computer, a tablet computer, a smartphone, a video game console, an in-vehicle computer, or another type of computing device. Network devices 16 may also include various types of computing devices. For example, network devices 16 may include server devices, firewall devices, routers, switches, personal computers, tablet computers, smartphones, video game consoles, in-vehicle computers, and/or other endpoint or intermediate computing devices. Network 14 may include various types of networks. For example, network 14 may comprise the internet, a local area network, a wide area network, or another type of network. Network 14 may include wired and/or wireless communication links.

In the example of FIG. 1, computing device 12 includes a memory 18, a network interface 20, a processor 22, and a display device 24. Memory 18 may comprise one or more non-transitory computer-readable data storage media, such as Random Access Memory (RAM) units, hard disk drives, Flash memory, and so on. Network interface 20 comprises hardware, such as a network interface card, that enables computing device 12 to communicate on network 14. Processor 22 comprises circuitry for executing instructions. Accordingly, processor 22 may be referred to as processing circuitry. For instance, processor 22 may comprise one or more microprocessors, field-programmable gate arrays, application-specific integrated circuits (ASICs), and so on. Display device 24 comprises hardware for displaying data. For example, display device 24 may comprise an LED panel, LCD panel, or another type of display. Although shown in the example of FIG. 1 as being within computing device 12, display device 24 may be outside of and separate from computing device 12. Interconnections 26 communicatively couple memory 18, network interface 20, processor 22, and display device 24.

Furthermore, in the example of FIG. 1, memory 18 stores user interface (UI) framework software 28, hierarchy definition data 30, plugin code modules 32A through 32N (collectively, "plugin code modules 32"), and plugin metadata 34A through 34N (collectively, "plugin metadata 34").

In the example of FIG. 1, processor 22 may execute software instructions of UI framework software 28 and plugin code modules 32. For concision, rather than describing processor 22 as performing particular actions when executing instructions of UI framework software 28 and plugin code modules 32, this disclosure may simply describe UI framework software 28 and plugin code modules 32 as performing the actions. As described in this disclosure, UI framework software 28 uses and interacts with hierarchy definition data 30, plugin code modes 32, and plugin metadata 34 to output for display a UI that includes one or more hierarchical navigation trees. Outputting a user interface for display may comprise sending signals to a display device (e.g., display device 24) that cause the display device to display the user interface.

In some examples, UI framework software 28 comprises a standalone application that executes on computing device 12. In some examples, UI framework software 28 operates in a web browser application executing on computing device 12. In some such examples, UI framework software 28 may comprise JavaScript code or code formatted in another programming language. In examples where UI framework software 28 operates in a web browser application, UI framework software 28 may communicate with the web browser application to control how the web browser application arranges a user interface for display. In some examples, UI framework software 28 executes on a server computing device and sends data to a web browser application on a client computing device to output the user interface. In some examples, UI framework software 28 executes partially at a server computing device and partially at a client computing device.

As briefly described above, hierarchical navigation trees are common design elements in graphical user interfaces. A hierarchical navigation tree includes a set of hierarchically arranged nodes. For instance, a root node of a hierarchical navigation tree may have one or more child nodes, one or more of the child nodes may have one or more child nodes of their own, and so on. Each node may have a corresponding label that is displayed in a GUI. For instance, the root node may be labeled "Devices," child nodes of the root node may be labeled "Routers," "Firewalls," and "Servers." In some examples, portions of a hierarchical navigation tree are collapsible such that all descendant nodes of a particular node of the hierarchical navigation tree are hidden in the GUI. In response to receiving an indication of user input directed to a node of a hierarchical navigation tree, a computing device may output for display a specific UI associated with the node. For instance, in the example above, selecting the node labeled "Routers" may cause the computing device to output a list of routers.

In the example of FIG. 1, UI framework software 28 may output a GUI for display on a display device, such as display device 24. The GUI may include a hierarchical navigation tree of the type described above. However, rather than nodes and interfaces associated with nodes being hardcoded into the instructions of UI framework software 28, UI framework software 28 generates the hierarchical navigation tree dynamically based on a set of UI plugins and hierarchy definition data 30.

Hierarchy definition data 30 defines a hierarchical navigation tree. In this disclosure, the hierarchical navigation tree may also be referred to as a navigation schema. The navigation schema may be defined to provide the universe of all valid global navigation paths in the hierarchy. The schema ensures that plugins cannot contribute arbitrary navigational paths to the UI. In some examples, elements in the navigation schema are encoded as abstract keys into a message bundle so that they assume no particular language encoding. In other words, human-language strings are not hard-coded into the navigation schema. In this example, keys into a translated message bundle are embedded in the schema instead. Thus, in this example, the navigation elements in the schema can be made language independent.

The hierarchical navigation tree comprises a tree of nodes. Each respective node of the hierarchical navigation tree is associated with a respective label. Hierarchy definition data 30 may define the hierarchical navigation tree in various ways. For example, the following hierarchy definition data is defined in JavaScript Object Notation (JSON) format:

```
{
    "name": "nav.monitors",
    "icon": "icon_monitors",
    "children": [
        {
            "name": "nav.alerts_alarms",
            "children": [
                {
                    "name":"nav.alerts"
                },
                {
                    "name": "nav.alert_definitions"
                },
                {
                    "name": "nav.alarms"
                }
            ]
        },
        {
            "name": "nav.log_and_events",
            "children": [
                {
                    "name": "nav.logs_events_all_event_categories"
                }, {
                    "name": "nav.logs_events_firewall"
                }, {
                    "name": "nav.logs_events_web_filtering"
                }, {
                    "name": "nav.logs_events_vpn"
                }, {
                    "name": "nav.logs_events_content_filtering"
                },{
                    "name": "nav.logs_events_anti_spam"
                },{
                    "name": "nav.logs_events_anti_virus"
                },{
                    "name": "nav.logs_events_ips"
                }
            ]
        },
        {
            "name": "nav.monitor.threat_management",
            "children": [
                {
                    "name": "nav.argon_hosts"
                },
                {
                    "name": "nav.argon_ccservers"
                },
                {
                    "name": "nav.argon_filescanning"
                },
                {
                    "name": "nav.threat_monitor"
                }
            ]
        },
    ]
}
```

In the example hierarchy definition data above, the "name" elements indicate labels associated with nodes of a navigation hierarchy tree, the "icon" elements identify optional icons associated with nodes of the navigation hierarchy tree and the elements enclosed in the brackets following a "children" element of a node correspond to child nodes of the node.

Each respective UI plugin is associated with a respective plugin code module and plugin metadata. For example, a first UI plugin may be associated with plugin code module 32A and plugin metadata 34A, a second UI plugin may be associated with plugin code module 32B and plugin metadata 34B, and so on. In some examples, the plugin metadata for a UI plugin is a manifest file that describes metadata for the plugin. The plugin code module for a UI plugin may comprise software code for producing a user interface for the UI plugin. In some examples, the plugin metadata for a UI plugin comprises a reference to the plugin code module for the UI plugin. For instance, the plugin metadata for a UI plugin may comprise a file system path, network path, or other data indicating how to access the plugin code module for the UI plugin. In some examples, the reference comprises a Uniform Resource Identifier (URI) or Uniform Resource Locator (URL). In some examples, the reference may identify an entry point to the plugin's implementation. For instance, the reference may indicate a location in memory or a computer-readable storage medium of the plugin's implementation.

In some examples, UI framework software 28 may use the reference to the plugin code module for the UI plugin to initiate execution of the UI plugin. UI framework software 28 may use the reference to the code module for the plugin to initiate execution of the plugin in various ways. For example, UI framework software 28 may perform an operating system call to initiate a new process or thread using the reference. In this disclosure, a "plugin" may be a plugin code module in execution. In another example, UI framework software 28 may execute in a web browser application. In this example, the reference to the code module for the plugin may comprise a Uniform Resource Locator (URL) or other identifier that UI framework software 28 may use to retrieve the plugin code module from a remote server or other storage location. In some examples, UI framework software 28 may use a JavaScript Object Notation (JSON) model for retrieving plugin code modules. In this example, the plugin code module may comprise JavaScript or code formatted in another programming language. Furthermore, in this example, after retrieving at least some of the plugin code module, UI framework software 28 may initiate execution of code within the plugin code module by invoking functions of the retrieved plugin code module. In some examples, plugin code modules usable by UI framework software 28 may implement a common set of functions (e.g., an API).

Furthermore, the plugin metadata for a UI plugin may comprise one or more path descriptors for the UI plugin. The path descriptor for the UI plugin defines a path from a root node of the hierarchical navigation tree to a leaf node of the hierarchical navigation tree. A leaf node is a node that has no child nodes.

The path descriptor for a UI plugin may comprise a series of one or more path elements for the UI plugin. Each respective path element of the series of one or more path elements identifies a respective node in a path through the nodes of the hierarchical navigation tree. For example, the hierarchical navigation tree may include a root node "1", the root node may include two child nodes "2" and "3". In this example, the path elements of a path descriptor for a UI plugin may identify nodes "1" and "2." In this disclosure, the path elements may be referred to as "keys."

In some examples, each element in a path descriptor of a UI plugin defines a path from a root node in the navigation schema to a second node deeper in a global navigation hierarchy that is associated with a starting point for a workflow in a UI. For instance, UI framework software 28 may output a UI elements (e.g., controls, data, text) associated with the UI plugin in response to receiving an indication of a user selection of the second node. In this context, a "workflow" may be a repeatable pattern of activity. For instance, the workflows associated with the UI plugins may each be a respective series of tasks for managing a customer's network infrastructure.

UI framework software 28 may read hierarchy definition data 30 and plugin metadata 34. In some examples, UI framework software 28 is configured to discover hierarchy definition data 30 and/or plugin metadata 34 based on hierarchy definition data 30 and/or plugin metadata 34 being stored at a particular location, such as a particular folder in a file system or web domain. In some examples, as UI framework software 28 discovers plugins, UI framework software 28 stores the plugin metadata of the plugins in an internal memory of UI framework software 28. For example, UI framework software 28 may build up a database of plugin metadata files read from the separate plugin metadata files. UI framework software 28 may allow plugins to be added and removed dynamically. For example, a software utility may be provided whose purpose is to manage the inventory of installed plugins. In some instances, the software utility may be part of UI framework software 28 or another software module or unit. The utility may install or remove plugins in response to user input or programmatic instructions. When a plugin is installed or removed, UI framework software 28 may automatically update the UI accordingly (e.g., either by marking path elements of the plugin as active or inactive).

UI framework software 28 may use hierarchy definition data 30 and plugin metadata 34 to mark particular nodes of the hierarchical navigation tree as being defined in a hierarchical navigation tree. For instance, for each respective UI plugin, UI framework software 28 may, for each respective node identified by a respective path element in a respective series of path elements for the respective UI plugin that have not previously been marked as active, mark the respective node identified by the respective path element as being active. Thus, in the example provided in the previous paragraph, UI framework software 28 may mark nodes "1" and "2" as being defined. UI framework software 28 may mark a node as being active in various ways. For example, UI framework software 28 may store data indicating that the node is active.

In some examples, UI framework software 28 rejects a UI plugin in response to determining a path descriptor for the UI plugin is invalid. UI framework software 28 may determine that a path descriptor for a UI plugin is invalid based on the path descriptor not specifying a valid path through the hierarchical navigation tree. In some examples, if UI framework software 28 rejects a UI plugin, UI framework software 28 does not mark any nodes in the hierarchical navigation tree as active on account of the UI plugin.

Furthermore, UI framework software 28 may output a UI for display. The UI may comprise a pruned representation of the hierarchical navigation tree. UI framework software 28 may generate the pruned representation of the hierarchical navigation tree such that, for each respective node of the plurality of nodes in the hierarchical navigation tree, the pruned representation of the hierarchical navigation tree includes a label of the respective node in response to determining the respective node is marked as active and the pruned representation of the hierarchical navigation tree includes no visible indication of the respective node in response to determining the respective node is not marked as active. Thus, in the example of the previous paragraph, the hierarchical navigation tree includes a label of the node "1" and a label of node "2", but not a label of node "3". Hence, the pruned representation of the hierarchical navigation tree may be one of a forest of possible navigation trees allowed by the navigation schema.

In some examples, in response to receiving an indication of user input directed to a label of a particular plugin in the pruned representation of the hierarchical navigation tree, UI framework software 28 may output for display data generated by execution of the particular UI plugin. For example, a plugin may generate a graphical element that indicates network probing attacks over time. In this example, UI framework software 28 may output the graphical element for display in response to receiving an indication of user input directed to a label for a node identified in a path descriptor (e.g., the last path element in the path descriptor, an intermediate path element in the path descriptor, the first path element in the path descriptor) for the plugin.

Thus, in the examples above, the UI may be a single-pane-of-glass UI in the sense that the UI may include data from multiple independent UI plugins and/or provide data to multiple independent UI plugins, but appear to the user as being a single seamless UI. In such a single-pane-of-glass UI, there may be no separate navigational elements (e.g., slide bars, back/forward buttons, etc.) for individual UI plugins, but rather navigational elements may be provided for the single-pane-of-glass UI as a whole. In some circumstances, having separate navigational elements contributed by the UI plugins may be considered antithetical to the single-pane-of-glass notion. Using a single-pane-of-glass UI as described in this disclosure may prevent a strong partitioning of the navigation space along plugin lines.

In some examples, UI framework software 28 implements access policies for UI plugins. Thus, if a user does not have access to a particular UI plugin, when processing the particular UI plugin to prepare to UI, UI framework software 28 does not mark nodes identified by the path descriptor for the particular UI plugin as active. Thus, such nodes are not marked as active (i.e., remain "inactive") unless they are identified by the path descriptor for a UI plugin to which the user does have access. In this way, for each respective node of a plurality of nodes in the hierarchy navigation tree, the pruned representation of the hierarchical navigation tree includes a label of the respective node in response to determining the respective node is marked as active and a current user of the UI has permission to access the respective node. The pruned representation of the hierarchical navigation tree includes no visible indication of the respective node in response to determining the respective node is not marked as active or the current user of the UI does not have permission to access the respective node.

Figure 2A:
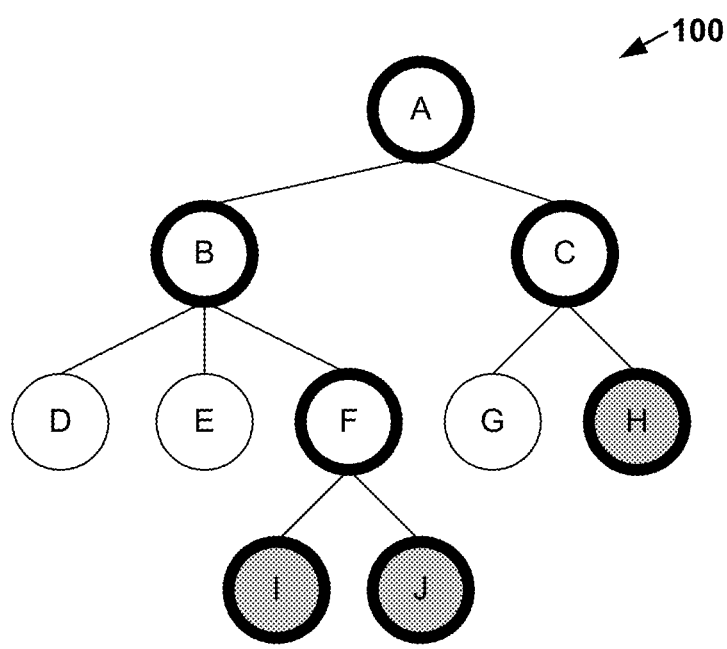
FIG. 2A is a conceptual diagram illustrating an example hierarchical navigation tree.

FIG. 2A is a conceptual diagram illustrating an example hierarchical navigation tree 100. Hierarchical navigation tree 100 includes nodes A through J. Node A is the root node of hierarchical navigation tree 100. Nodes D, E, I, J, G, and H are leaf nodes of hierarchical navigation tree 100. Furthermore, in the example of FIG. 2A, "active" nodes are illustrated with heavy lines, while non-active nodes are illustrated with lighter lines. Thus, nodes A, B, C, F, I, J, and H are active nodes and nodes D, E, and G are non-active nodes.

Figure 2B:
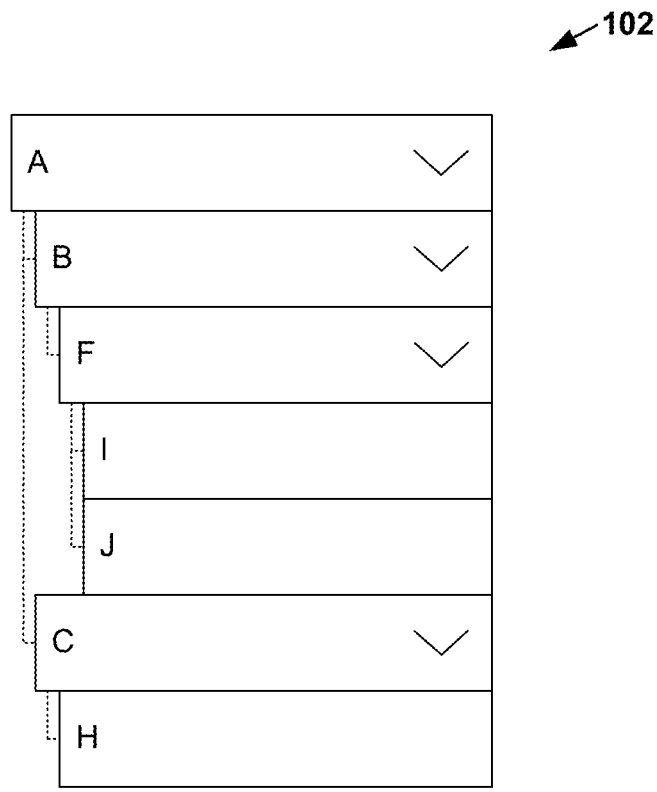
FIG. 2B is a conceptual diagram illustrating an example pruned representation of the hierarchical navigation tree of FIG. 2A.

FIG. 2B is a conceptual diagram illustrating an example pruned representation 102 of hierarchical navigation tree 100 of FIG. 2A. Pruned representation 102 includes UI elements (e.g., rectangular boxes) corresponding to active nodes of hierarchical navigation tree 100. As shown in the example of FIG. 2A, nodes A, B, C, F, H, I and J are active nodes. Accordingly, pruned representation 102 includes respective labels of nodes A, B, C, F, H, I, and J. Pruned representation 102 includes no visible indication of nodes D, E, and G, which are not marked as active.

In the example of FIG. 2B, UI framework software 28 (FIG. 1) may receive an indication of user input directed to one of the UI elements of pruned representation 102. In response, UI framework software 28 may output, for display, data generated by execution of a UI plugin corresponding the UI element.

UI framework software 28 may hide UI elements corresponding to child nodes of a given node in response to receiving an indication of user input to do so. For example, UI framework software 28 may hide the UI elements for nodes I and J in response to receiving an indication of user input directed to the downward arrow in the UI element for node F. Similarly, if the UI elements for child nodes of a particular node are hidden, UI framework software 28 may reveal the UI elements for the child nodes in response to receiving an indication of user input to do so. For example, supposing the UI element for node H was hidden, UI framework software 28 may reveal the UI element for node H in response to receiving an indication of user input directed to the UI element for node C.

Figure 3A:
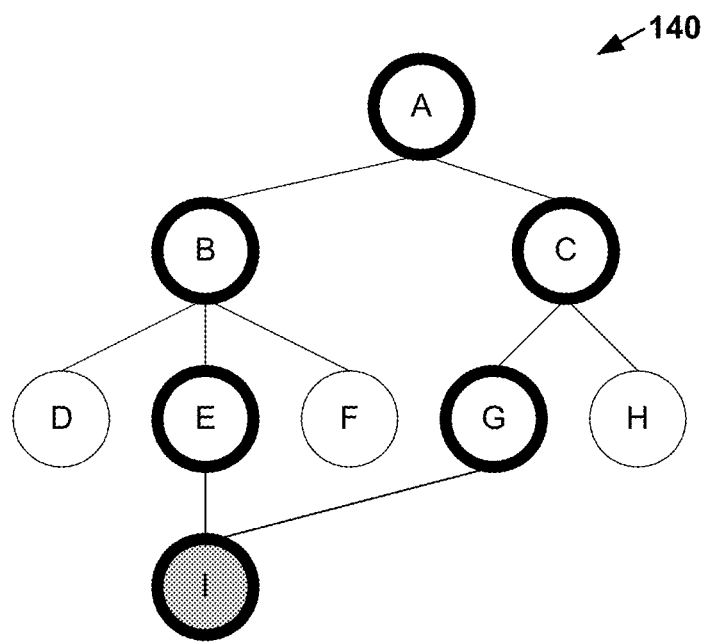
FIG. 3A is a conceptual diagram illustrating an example hierarchical navigation tree.

FIG. 3A is a conceptual diagram illustrating an example hierarchical navigation tree 140. Hierarchical navigation tree 140 is similar to hierarchical navigation tree 100, except that hierarchical navigation tree 140 includes a leaf node that has two parent nodes. A leaf node having two parent nodes can arise in examples where the plugin metadata for a UI plugin is allowed to define multiple path identifiers for a UI plugin. In the example of FIG. 3A, the plugin metadata for a UI plugin corresponding to node I may specify a first path A-B-E-I and a second path A-C-G-I.

Figure 3B:
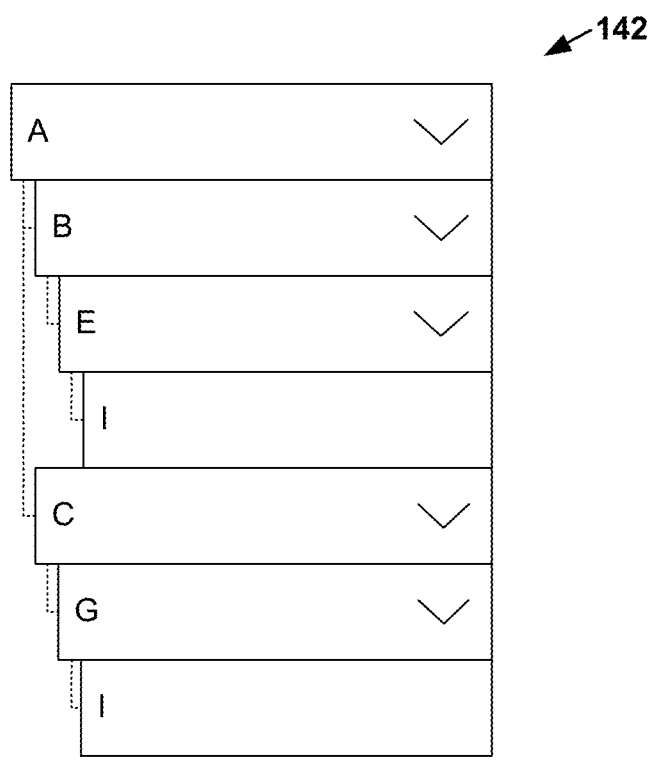
FIG. 3B is a conceptual diagram illustrating an example pruned representation of the hierarchical navigation tree of FIG. 3A.

FIG. 3B is a conceptual diagram illustrating an example pruned representation 142 of hierarchical navigation tree 140 of FIG. 3A. Pruned representation 142 in the example of FIG. 3B is similar to pruned representation 102 of FIG. 2B. However, since node I of hierarchical navigation tree 140 (FIG. 3A) has two path descriptors, both paths to node I are represented in pruned representation 142. Thus, a user has two ways through a hierarchical navigation tree to access node I.

Figure 4:
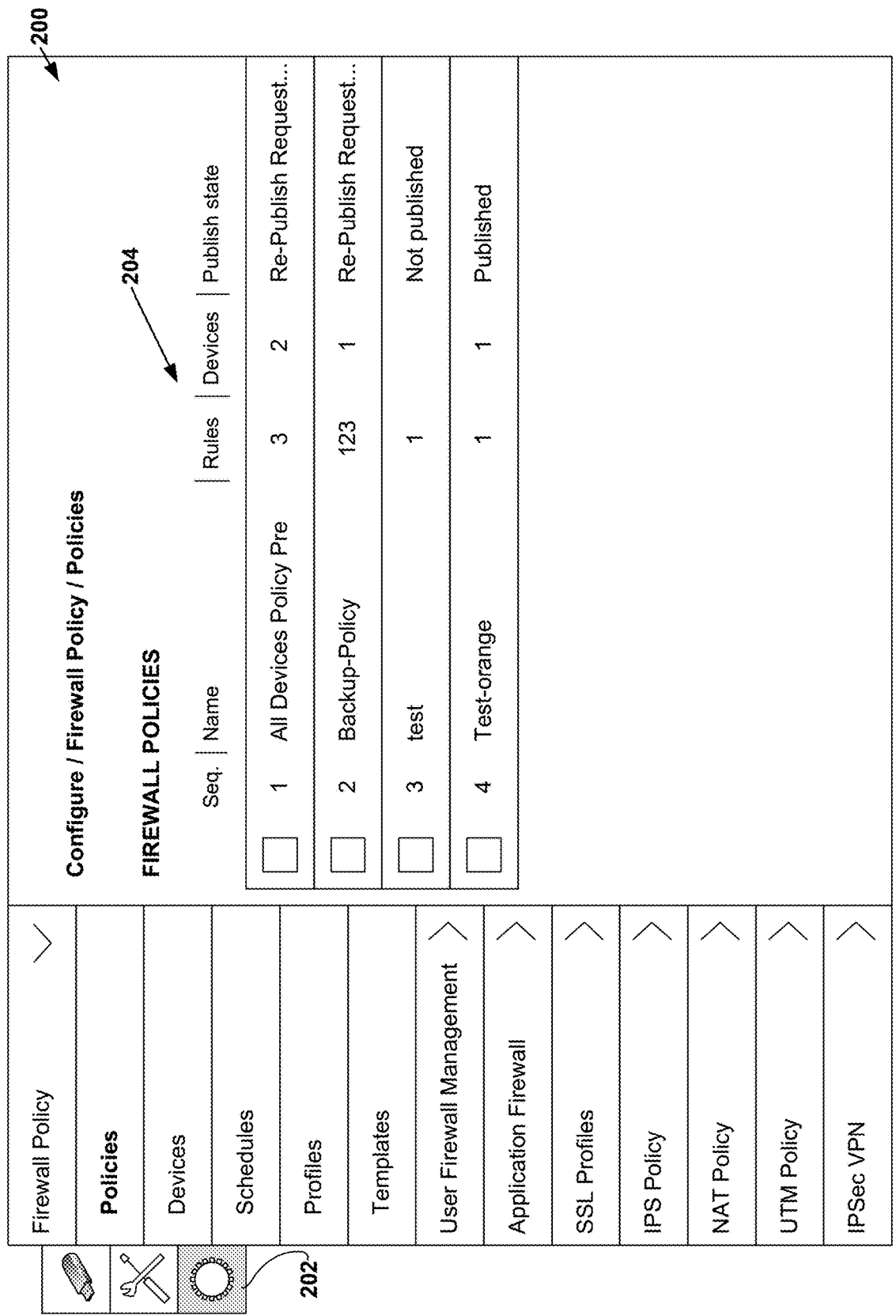
FIG. 4 is a conceptual diagram illustrating a network administration user interface (UI) that includes a hierarchical navigation tree in accordance with a technique of this disclosure.

FIG. 4 is a conceptual diagram illustrating a network administration UI 200 that includes a pruned representation of a hierarchical navigation tree in accordance with a technique of this disclosure. In the example of FIG. 4, UI 200 can include representations of multiple hierarchical navigation trees. Instead of text labels as shown in FIGS. 2B and 3B, the representation of an associated hierarchical navigation tree has a gear icon 202 for the root node. Note that UI 200 may include representations of multiple hierarchical navigation trees, such as those shown in UI 200 with a USB stick and tools for their root nodes. Thus, there may be a forest of hierarchical navigation trees.

In the example of FIG. 4, the labels for nodes at a second tier of the hierarchical navigation tree are "Firewall Policy," "User Firewall Management," "Application Firewall," "SSL Profiles," "IPS Policy," "NAT Policy," "UTM Policy," and "IPSec VPN." Furthermore, in the example of FIG. 4, the labels for child nodes of the "Firewall Policy" node are "Policies, "Devices," "Schedules," "Profiles," and "Templates." The label for the "Policies" node is bolded to indicate that the "Policies" node is currently selected.

Because the "Policies" node is currently selected, UI 200 displays data 204 generated by a plugin associated with the "Policies" node. Data 204 includes firewall policies.

Figure 5:
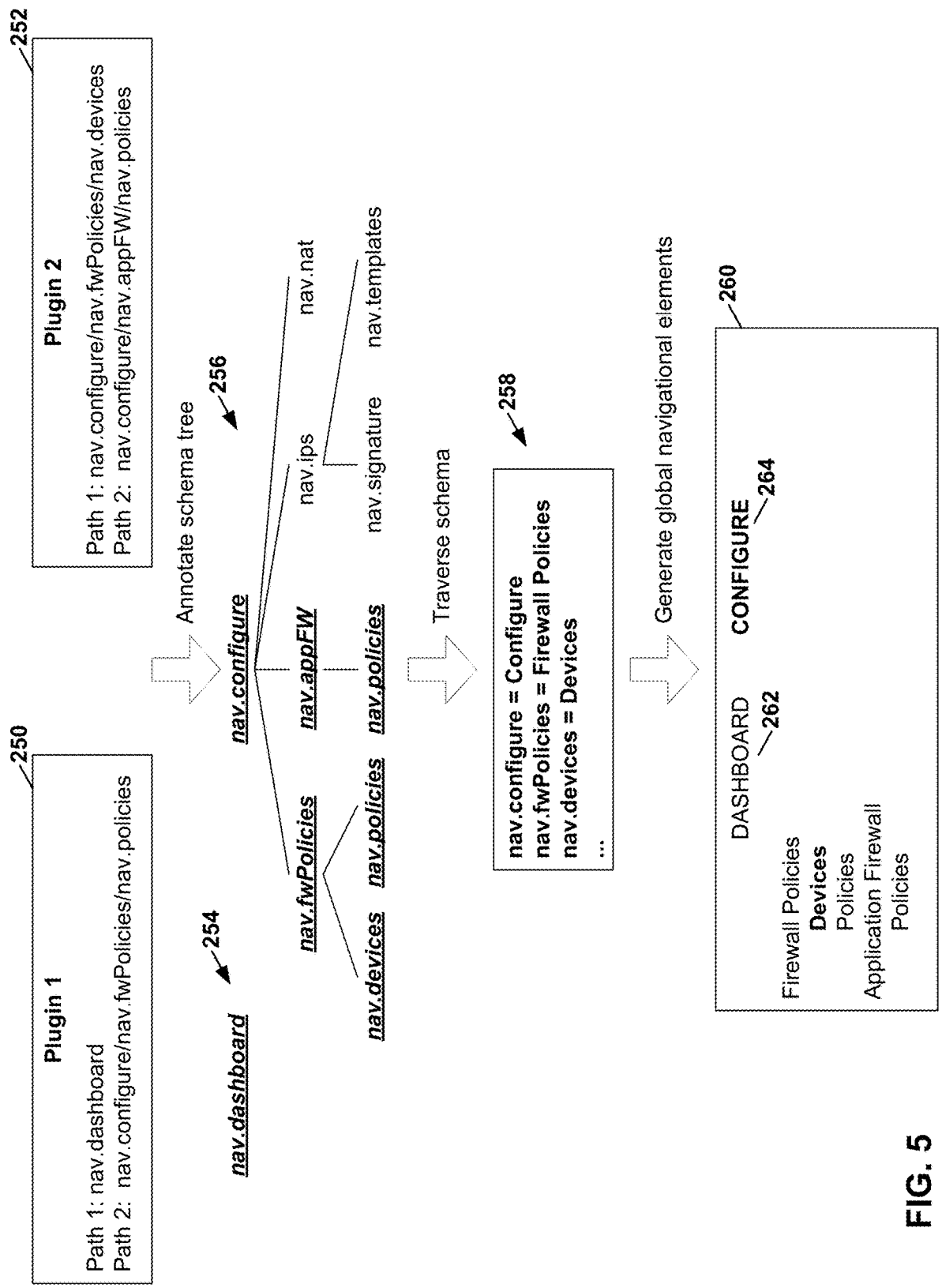
FIG. 5 is a conceptual diagram illustrating an example process for generating a UI in accordance with a technique of this disclosure.

FIG. 5 is a conceptual diagram illustrating an example process for generating a UI in accordance with a technique of this disclosure. FIG. 5 shows plugin metadata 250 for a plugin "Plugin 1" and plugin metadata 252 for a plugin "Plugin 2." Plugin metadata 250 includes two path descriptors labeled "Path 1" and "Path 2," respectively. Path 1 of plugin metadata 250 includes a single path element "nav.dashboard." Path 2 of plugin metadata 250 includes three path elements separated by slash "l" characters: "nav.configure/nav.fwPolicies/nav.policies." Plugin metadata 252 includes two path descriptors labeled "Path 1" and "Path 2," respectively. Path 1 of plugin metadata 252 includes three path elements: "nav.configure/nav.fwPolicies/nav.devices." Path 2 of plugin metadata 252 includes three path elements: "nav.configure/nav.appFW/nav.policies."

Furthermore, the example of FIG. 5 includes a hierarchical navigation tree 254 and a hierarchical navigation tree 256. Hierarchical navigation tree 254 includes only a single node: "nav.dashboard." Hierarchical navigation tree 256 includes nodes: "nav.configure," "nav.fwPolicies," "nav.appFW," "nap.ips," "nav.nat," "nav.devices," "nav.policies," "nav.policies," "nav.signature," and "nav.templates." UI framework software 28 (FIG. 1) may annotate hierarchical navigation trees 254 and 256. In other words, UI framework software 28 may mark particular nodes of hierarchical navigation trees 254, 256 as being defined (i.e., active) in hierarchical navigation trees 254, 256. In the example of FIG. 5, nodes with emphasized text are active and nodes with unemphasized text are inactive. Since path 1 of plugin metadata 250 specifies "nav.dashboard," the node "nav.dashboard" in hierarchical navigation tree 254 is active. Since path 2 of plugin metadata 250 specifies "nav.configure," "nav.fwPolicies," and "nav.policies," these nodes are active in hierarchical navigation tree 256. Since path 1 of plugin metadata 252 specifies "nav.configure," nav.fwPolicies," and "nav.devices," these nodes are active in hierarchical navigation tree 256. Moreover, since path 2 of plugin metadata 252 specifies "nav.configure," "nav.appFW," and "nav.policies," these nodes are active in hierarchical navigation tree 256.

In the example of FIG. 5, each node of hierarchical navigation trees 254, 256 is mapped 258 to a user-friendly label. For instance, "nav.configure" is mapped to "Configure," "nav.fwPolicies" is mapped to "Firewall Policies," and "nav.devices" is mapped to "Devices." As part of UI framework software 28 determining the labels for the nodes, UI framework software 28 may traverse hierarchical navigation trees 254, 256 and look up labels for nodes marked as active. Based on this mapping of node names to labels, UI framework software 28 may generate a UI 260 that includes pruned versions of hierarchical navigation trees 254, 256. In other words, UI framework software 28 may generate global navigational elements. UI 260 includes the labels for active nodes of hierarchical navigation trees 254, 256.

In the example of FIG. 5, UI 260 only includes pruned navigation trees for one of hierarchical navigation trees 254, 256 at a time. Particularly, in the example of FIG. 5, UI 260 includes elements 262, 264 for hierarchical navigation trees 254, 256, respectively. FIG. 5 shows a pruned navigation tree for hierarchical navigation tree 256 because element 264 is selected. Thus, multiple navigation trees can be displayed in a single-pane-of-glass interface. Moreover, because plugins (e.g., Plugin 1) can include multiple path descriptors that specify paths in different hierarchical navigation trees, interfaces for plugins can be navigated to through different hierarchical navigation trees in different ways. Therefore, depending on the context with which a user is using UI 260 (i.e., a single-pane-of-glass UI), the user may navigate to an interface for a plugin in different ways. For instance, in the example of FIG. 5, if the user is performing tasks in the context of configuring devices, the user may elect to navigate to an interface for Plugin 1 through the "Configure" hierarchical navigation tree, while if the user is performing tasks related to monitoring devices, the user may elect to navigate to the interface for Plugin 1 through the "Dashboard" hierarchical navigation tree.

In some examples, UI framework software 28 may be configured with multiple hierarchical navigation trees, such as hierarchical navigation trees 254 and 256. Furthermore, in response to receiving an indication of a user input to select a particular node in a first one of the hierarchical navigation tree, UI framework software 28 may output a UI based on a second one of the hierarchical navigation trees in place of the first hierarchical navigation tree. For instance, in the example of FIG. 5, UI framework software 28 may output in UI 260 a pruned hierarchical navigation tree based on the "dashboard" hierarchical navigation tree 254 in place of the pruned hierarchical navigation based on the "configure" hierarchical navigation tree 256 in response to receiving an indication of a user selection of the "Devices" node of the "configure" hierarchical navigation tree 256. In some examples, UI framework software 28 may replace the pruned hierarchical navigation trees in this manner in response to receiving indications of user selection of various elements, including labels of nodes or various elements (e.g., links) in user interfaces associated with nodes. Switching navigational hierarchies in the manner may allow the user to access desired information or functionality more efficiently.

Figure 6:
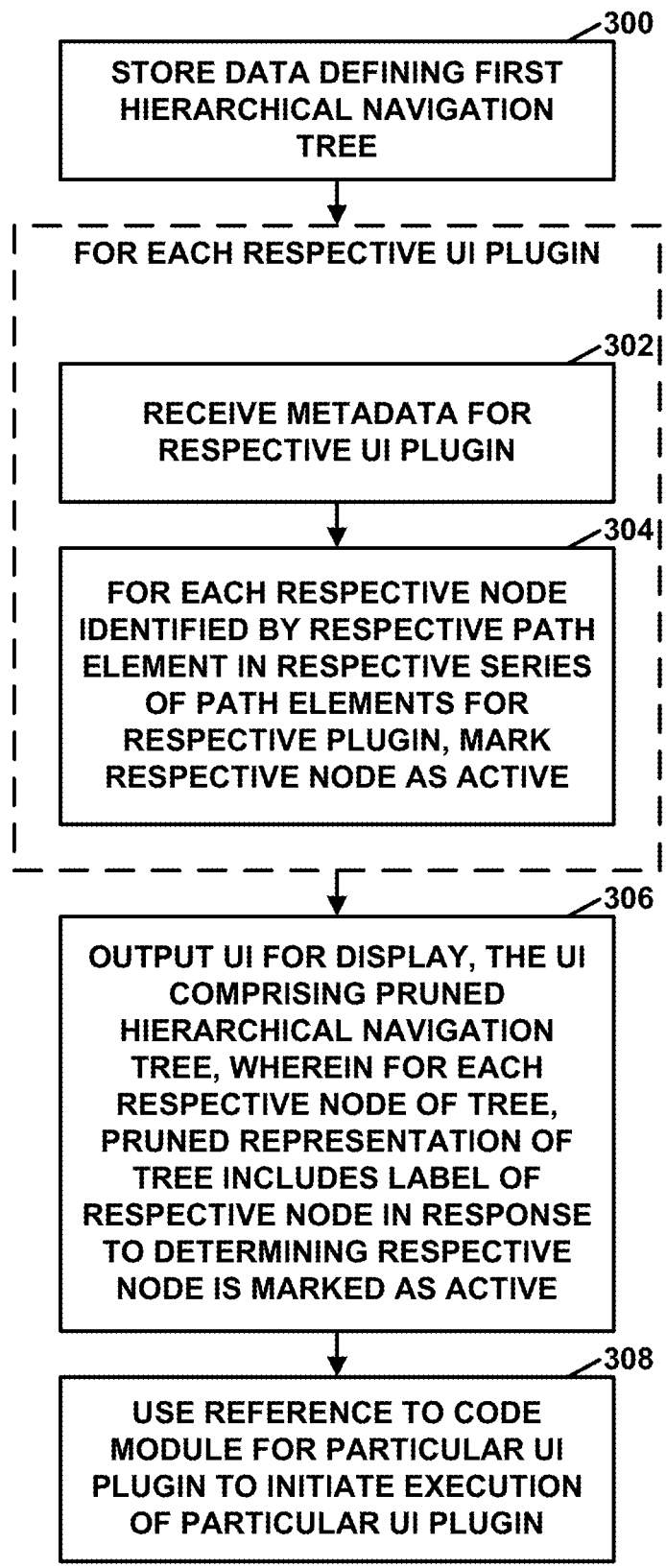
FIG. 6 is a flowchart of an example operation in accordance with a technique of this disclosure.

FIG. 6 is a flowchart of an example operation in accordance with a technique of this disclosure. The flowcharts of this application are provided as examples. Other examples may include more, fewer, or different actions. In some examples, actions of the flowcharts may be performed in different orders and/or in parallel.

In the example of FIG. 6, computing device 12 (FIG. 1) may store data defining a hierarchical navigation tree that comprises a tree of nodes (300). For example, computing device 12 may store, in memory 18 (FIG. 1), XML, data or data formatted according to another scheme that defines the hierarchical navigation tree.

Furthermore, computing device 12 may perform actions (302) and (304) for each respective user interface (UI) plugin of a plurality of UI plugins. Particularly, UI framework software 28 (FIG. 1) of computing device 12, may receive metadata for the respective UI plugin (302). The metadata for the respective UI plugin may comprise a reference to a code module for the respective UI plugin. The code module for the respective UI plugin may comprise software code that implements the respective UI plugin. Additionally, the metadata for the respective UI plugin may further comprise a respective path descriptor for the respective UI plugin. The respective path descriptor for the respective UI plugin may comprise a respective series of one or more path elements for the respective UI plugin. Each respective path element of the respective series of path elements for the respective UI plugin may identify a respective node in a path through the nodes of the hierarchical navigation tree.

For each respective node identified by a respective path element in the respective series of path elements for the respective UI plugin that has not previously been marked as active, UI framework software 28 may mark the respective node identified by the respective path element as being active (304). In other words, UI framework software 28 may annotate the hierarchical navigation tree to mark nodes. In some examples, UI framework software 28 performs a recursive operation to mark the nodes. For example, UI framework software 28 may perform, for a particular node of the hierarchy navigation tree, an operation that determines whether the path descriptor of any UI plugin of the plurality of UI plugins includes a path element identifying the particular node. Furthermore, as part of performing the operation, in response to determining the path descriptor of at least one UI plugin of the plurality of UI plugins includes a path element identifying the particular node, UI framework software 28 marks the particular node as active and recursively invokes the operation for each child node of the particular node.

Furthermore, UI framework software 28 may output a UI for display (306). The UI comprises a pruned representation of the hierarchical navigation tree. For each respective node of a plurality of nodes in the hierarchical navigation tree, the pruned representation of the hierarchical navigation tree includes a label of the respective node in response to determining the respective node is marked as active. The pruned representation of the hierarchical navigation tree includes no visible indication of the respective node in response to determining the respective node is not marked as active. As part of outputting the UI, UI framework software 28 may perform an in-order traversal of the hierarchical navigation tree and output for display those nodes of the hierarchical navigation tree marked as active.

Furthermore, for a particular UI plugin of the plurality of UI plugins, UI framework software 28 may use the reference to the code module for the particular UI plugin to initiate execution of the particular UI plugin (308). For example, the particular UI plugin may generate data related to the temperature of a data center. In this example, UI framework software 28 use the reference to the code module of the particular UI plugin to initiate execution of the particular UI plugin in accordance with any of the examples provided elsewhere in this disclosure.

In some examples, UI framework software 28 may display data generated by UI plugins in response to receiving indications of user input directed to labels of nodes identified by the path descriptors of the nodes. For instance, a path element of a series of path elements for a particular UI plugin may identify a particular node in the hierarchical navigation tree and in response to receiving an indication of user input directed to a label of the particular node, computing device 12 (FIG. 1) may output, for display, data generated by execution of the particular UI plugin.

Figure 7:
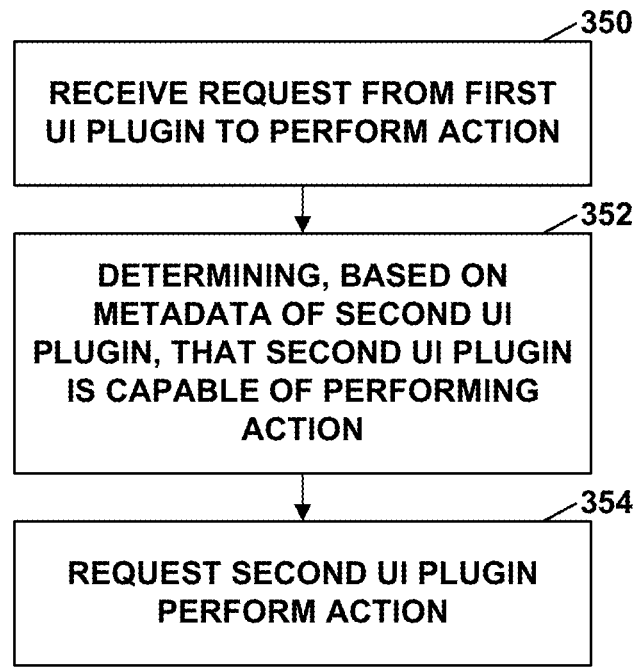
FIG. 7 is a flowchart illustrating an example operation for communication between plugins, in accordance with a technique of this disclosure.

FIG. 7 is a flowchart illustrating an example operation for communication between plugins, in accordance with a technique of this disclosure. In some examples, different plugins are able to communicate with each other via UI framework software 28 (FIG. 1). Such communication may be valuable in various contexts. For example, Plugin A may implement a workflow to define and deploy a virtual firewall. At the end of the workflow the software predicts (based on usage patterns) that the next most likely workflow that the user will perform is to configure the newly deployed virtual firewall. However, the plugin that defines virtual firewalls is not capable of performing firewall configuration. So, the plugin that defines virtual firewalls requests that UI framework software 28 query the metadata that UI framework software 28 has obtained from the active plugins to see if there is a plugin that is capable of performing firewall configuration, and asks UI framework software 28 to execute the plugin if such a plugin exists. If such a plugin exists, UI framework software 28 invokes the plugin, resulting in one seamless workflow between the workflows of the plugins.

As shown in the example of FIG. 7, UI framework software 28 may receive a request from the first UI plugin to perform an action (350). For example, UI framework software 28 may receive an invocation of a method or function of UI framework software 28. Furthermore, UI framework software 28 may determine, based on the metadata of a second UI plugin, that the second UI plugin is capable of performing the action (352). For example, UI framework software 28 may scan a registry of actions that discovered plugins are capable of performing. UI framework software 28 may request the second UI plugin perform the action (354). For example, UI framework software 28 may invoke a function of the second UI plugin to perform the action.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
storing, by a computing device, data defining a hierarchical navigation tree that comprises a tree of nodes;
for each respective user interface (UI) plugin of a plurality of UI plugins:
receiving, by UI framework software executing on the computing device, metadata for the respective UI plugin, the metadata for the respective UI plugin comprising a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and
for each respective node identified by a respective path element in the respective series of path elements for the respective UI plugin that has not previously been marked as active, marking, by the UI framework software, prior to ever outputting a UI comprising a pruned representation of the hierarchical navigation tree for display, the respective node identified by the respective path element as being active;
outputting, by the computing device, the UI for display, the UI comprising the pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active, and the pruned representation of the hierarchical navigation tree includes no visible indication of the respective node in response to determining the respective node is not marked as active; and
for a particular UI plugin of the plurality of UI plugins, using, by the UI framework software, the reference to the code module for the particular UI plugin to initiate execution of the particular UI plugin.

2. The method of claim 1, wherein a path element of the series of path elements for the particular UI plugin identifies a particular node in the hierarchical navigation tree, the method further comprising:
in response to receiving an indication of user input directed to a label of the particular node, outputting, by the computing device, for display, data generated by execution of the particular UI plugin.

3. The method of claim 1, wherein the particular UI plugin is a first UI plugin and the plurality of UI plugins includes a second UI plugin, the method further comprising:
receiving, by the UI framework software, a request from the first UI plugin to perform an action;
determining, by the UI framework software, based on the metadata of the second UI plugin, that the second UI plugin is capable of performing the action; and
requesting, by the UI framework software, the second UI plugin perform the action.

4. The method of claim 1, comprising:
performing, by the UI framework software, for a particular node of the hierarchy navigation tree, an operation that:
determines whether the path descriptor of any UI plugin of the plurality of UI plugins includes a path element identifying the particular node; and
in response to determining the path descriptor of at least one UI plugin of the plurality of UI plugins includes a path element identifying the particular node:
marks the particular node as active; and
invokes the operation for each child node of the particular node.

5. The method of claim 1, wherein, for each respective node of a plurality of nodes in the hierarchy navigation tree, the pruned representation of the hierarchical navigation tree includes a label of the respective node in response to determining the respective node is marked as active and a current user of the UI has permission to access the respective node, wherein the pruned representation of the hierarchical navigation tree includes no visible indication of the respective node in response to determining the respective node is not marked as active or the current user of the UI does not have permission to access the respective node.

6. The method of claim 1, wherein the plurality of UI plugins includes a particular UI plugin, the metadata for the particular UI plugin includes multiple different path descriptors, the method comprising:
for each respective path descriptor of the multiple different path descriptors of the particular UI plugin:
for each respective node identified by a respective path element in the respective series of path elements in the respective path descriptor of the respective UI plugin that has not previously been marked as active, marking, by the UI framework software, the respective node identified by the respective path element as being active.

7. A computing device comprising:
a memory configured to store data defining a hierarchical navigation tree that comprises a tree of nodes; and
one or more processing circuits configured to:
for each respective user interface (UI) plugin of a plurality of UI plugins:
receive metadata for the respective UI plugin, the metadata for the respective UI plugin comprises a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and
for each respective node identified by a respective path element in the respective series of path elements for the respective UI plugin that has not previously been marked as active, prior to ever outputting a UI comprising a pruned representation of the hierarchical navigation tree for display, mark the respective node identified by the respective path element as being active;

output the UI for display, the UI comprising the pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active, and the pruned representation of the hierarchical navigation tree includes no visible indication of the respective node in response to determining the respective node is not marked as active; and for a particular UI plugin of the plurality of UI plugins, use the reference to the code module for the particular UI plugin to initiate execution of the particular UI plugin.

8. The computing device of claim 7, wherein a path element of the series of path elements for the particular UI plugin identifies a particular node in the hierarchical navigation tree, and the one or more processing circuits are further configured to:

in response to receiving an indication of user input directed to a label of the particular node, output, for display, data generated by execution of the particular UI plugin.

9. The computing device of claim 7, wherein the particular UI plugin is a first UI plugin and the plurality of UI plugins includes a second UI plugin, the one or more processing circuits are further configured to:

receive a request from the first UI plugin to perform an action;

determine, based on the metadata of the second UI plugin, that the second UI plugin is capable of performing the action; and request the second UI plugin perform the action.

10. The computing device of claim 7, wherein the one or more processing circuits are configured to:

perform, for a particular node of the hierarchy navigation tree, an operation that:

determines whether the path descriptor of any UI plugin of the plurality of UI plugins includes a path element identifying the particular node; and in response to determining the path descriptor of at least one UI plugin of the plurality of UI plugins includes a path element identifying the particular node:

marks the particular node as active; and invokes the operation for each child node of the particular node.

11. The computing device of claim 7, wherein, for each respective node of a plurality of nodes in the hierarchy navigation tree, the pruned representation of the hierarchical navigation tree includes a label of the respective node in response to determining the respective node is marked as active and a current user of the UI has permission to access the respective node, wherein the pruned representation of the hierarchical navigation tree includes no visible indication of the respective node in response to determining the respective node is not marked as active or the current user of the UI does not have permission to access the respective node.

12. The computing device of claim 7, wherein the plurality of UI plugins includes a particular UI plugin, the metadata for the particular UI plugin includes multiple different path descriptors, the one or more processing circuits configured to:

for each respective path descriptor of the multiple different path descriptors of the particular UI plugin:

for each respective node identified by a respective path element in the respective series of path elements in the respective path descriptor of the respective UI plugin that has not previously been marked as active, mark the respective node identified by the respective path element as being active.

13. A non-transitory computer-readable data storage medium having instructions thereon that, when executed, configure a computing device to:

store data defining a hierarchical navigation tree that comprises a tree of nodes;

for each respective user interface (UI) plugin of a plurality of UI plugins:

receive metadata for the respective UI plugin, the metadata for the respective UI plugin comprises a reference to a code module for the respective UI plugin, the code module for the respective UI plugin comprising software code that implements the respective UI plugin, the metadata for the respective UI plugin further comprising a respective path descriptor for the respective UI plugin, the respective path descriptor for the respective UI plugin comprising a respective series of one or more path elements for the respective UI plugin, each respective path element of the respective series of path elements for the respective UI plugin identifying a respective node in a path through the nodes of the hierarchical navigation tree; and for each respective node identified by a respective path element in the respective series of path elements for the respective UI plugin that has not previously been marked as active, prior to ever outputting a UI comprising a pruned representation of the hierarchical navigation tree for display, mark the respective node identified by the respective path element as being active;

output the UI for display, the UI comprising the pruned representation of the hierarchical navigation tree, wherein, for each respective node of a plurality of nodes in the hierarchical navigation tree, the pruned representation of the hierarchical navigation tree includes a label of the respective node in response to determining the respective node is marked as active, and the pruned representation of the hierarchical navigation tree includes no visible indication of the respective node in response to determining the respective node is not marked as active; and for a particular UI plugin of the plurality of UI plugins, use the reference to the code module for the particular UI plugin to initiate execution of the particular UI plugin.

14. The non-transitory computer-readable storage medium of claim 13, wherein a path element of the series of path elements for the particular UI plugin identifies a particular node in the hierarchical navigation tree, execution of the instructions further configuring the computing device to:

in response to receiving an indication of user input directed to a label of the particular node, output, for display, data generated by execution of the particular UI plugin.

15. The non-transitory computer-readable storage medium of claim 13, wherein the particular UI plugin is a first UI plugin and the plurality of UI plugins includes a second UI plugin, execution of the instructions further configuring the computing device to:

receive a request from the first UI plugin to perform an action;

determine based on the metadata of the second UI plugin, that the second UI plugin is capable of performing the action; and request the second UI plugin perform the action.

16. The non-transitory computer-readable storage medium of claim 13, wherein execution of the instructions further configures the computing device to:

perform, for a particular node of the hierarchy navigation tree, an operation that:

determines whether the path descriptor of any UI plugin of the plurality of UI plugins includes a path element identifying the particular node; and in response to determining the path descriptor of at least one UI plugin of the plurality of UI plugins includes a path element identifying the particular node:

marks the particular node as active; and invokes the operation for each child node of the particular node.

17. The non-transitory computer-readable storage medium of claim 13, wherein, for each respective node of a plurality of nodes in the hierarchy navigation tree, the pruned representation of the hierarchical navigation tree includes a label of the respective node in response to determining the respective node is marked as active and a current user of the UI has permission to access the respective node, wherein the pruned representation of the hierarchical navigation tree includes no visible indication of the respective node in response to determining the respective node is not marked as active or the current user of the UI does not have permission to access the respective node.

18. The non-transitory computer-readable storage medium of claim 13, wherein the plurality of UI plugins includes a particular UI plugin, the metadata for the particular UI plugin includes multiple different path descriptors, execution of the instructions further configuring the computing device to:

for each respective path descriptor of the multiple different path descriptors of the particular UI plugin:

for each respective node identified by a respective path element in the respective series of path elements in the respective path descriptor of the respective UI plugin that has not previously been marked as active, mark the respective node identified by the respective path element as being active.

\* \* \* \* \*